US012041943B2

(12) United States Patent
Flammann et al.

(10) Patent No.: US 12,041,943 B2
(45) Date of Patent: Jul. 23, 2024

(54) APPARATUS AND METHOD OF CONVEYING AND EJECTING SEPARATED FOOD PORTIONS

(71) Applicant: VEMAG Maschinenbau GmbH, Verden/Aller (DE)

(72) Inventors: Uwe Flammann, Kirchlinteln (DE); Simon Stubbe, Dorverden (DE); Harald Wagner, Verden (DE); Gaylord Blume, Langwedel (DE)

(73) Assignee: VEMAG Maschinenbau GmbH, Verden (DE)

( * ) Notice: Subject to any disclaimer, the term of this patent is extended or adjusted under 35 U.S.C. 154(b) by 153 days.

(21) Appl. No.: 17/949,565

(22) Filed: Sep. 21, 2022

(65) Prior Publication Data

US 2023/0107041 A1 Apr. 6, 2023

(30) Foreign Application Priority Data

Sep. 24, 2021 (DE) .......................... 102021124801.9

(51) Int. Cl.
*A22C 11/00* (2006.01)
*B65G 15/14* (2006.01)
*B65G 43/08* (2006.01)
*B65G 47/34* (2006.01)
*A22C 11/10* (2006.01)

(52) U.S. Cl.
CPC ............ *A22C 11/008* (2013.01); *B65G 15/14* (2013.01); *B65G 43/08* (2013.01); *B65G 47/34* (2013.01); *A22C 11/10* (2013.01); *B65G 2203/0208* (2013.01); *B65G 2811/095* (2013.01)

(58) Field of Classification Search
CPC ....... A22C 11/008; A22C 11/10; B65G 15/14; B65G 47/34; B65G 2811/095
USPC .......................................................... 452/47
See application file for complete search history.

(56) References Cited

U.S. PATENT DOCUMENTS

2016/0143300 A1* 5/2016 Willburger ......... A22C 17/0093
452/51
2017/0112150 A1* 4/2017 Willburger ............. A22C 11/02

FOREIGN PATENT DOCUMENTS

| CN | 110482121 A | 11/2019 |
| DE | 3731051 A1 | 3/1989 |
| DE | 4318301 A1 | 12/1993 |

(Continued)

OTHER PUBLICATIONS

German Patent Office, Examination Report issed in DE 10 2021 124 801.9, dated Jan. 1, 2022 (6 pages).

(Continued)

*Primary Examiner* — Richard T Price, Jr.
(74) *Attorney, Agent, or Firm* — Wood Herron & Evans LLP

(57) ABSTRACT

An ejector device is provided for food portions, and in particular for sausages. A food portion in a conveying area between two conveyor belts is engaged in a conveying mode and can be conveyed in the conveying direction. It is proposed that the ejector device has at least one adjustment mechanism for ejecting a food portion in an ejection area, which is so designed that the distance of the conveyor belts from each other in the conveying area can be partially varied. A method of ejecting food portions is also provided, in which it is proposed that the food portions be taken out of engagement with the conveyor belts as described above.

14 Claims, 4 Drawing Sheets

(56) References Cited

FOREIGN PATENT DOCUMENTS

| | | |
|---|---|---|
| DE | 19810046 C1 | 12/1999 |
| DE | 102008012783 A1 | 9/2009 |
| DE | 102010002827 A1 | 9/2011 |
| EP | 3281529 A1 | 2/2018 |

OTHER PUBLICATIONS

European Patent Office, Search Report issued in European Patent App. No. 22197471.0, dated Feb. 10, 2023 (8 Pages).

* cited by examiner

APPARATUS AND METHOD OF CONVEYING AND EJECTING SEPARATED FOOD PORTIONS

CROSS-REFERENCE TO RELATED APPLICATION

This application claims priority to, German Application No. 10 2021 124 801.9, filed Sep. 24, 2021. The above-mentioned patent application is incorporated herein by reference in its entirety.

TECHNICAL FIELD

This application relates to an ejector device for food portions, in particular for sausages, including two circulating and spaced-apart conveyor belts which can be driven by at least one drive element and which form a belt pair and have a conveying area and a return area. This application further relates to a method of ejecting sausages, in which the sausages are engaged by parallel conveyor belts, such that the sausages can be conveyed in a preferably defined position in a particular conveying direction.

BACKGROUND

Sausage lines, so called, are used for the industrial production of food portions made of a pasty food mass, for example sausages. In such sausage lines, various items of equipment such as stuffing machines, portioning machines, twist linking devices and machines and/or separator devices are combined to form a coordinated system. To convey the portions along or between the various items of equipment, the food portions are deposited on conveyor belts or engaged between parallel belts. After the food portions have been produced, they are normally processed further or packaged by packaging machines. Prior to packaging, any non-compliant portions, for example previously detected burst sausages, have to be ejected from the process so as to prevent such portions from being packaged. The expression sausage as used in the following should be understood to mean any food portions made of pasty food mass that are preferably kept inside a casing. The casing consists of natural, collagen or cellulose gut or is a (co-extruded) alginate casing.

It is advantageous, with regard to the ejection of sausages, if this process is carried out as far as possible while the sausages are being conveyed between the individual processing stations or items of equipment within a more complex system, and in an automatic process that does not involve any delays in conveying the sausages. It may be desirable in this regard that the ejected sausages fall into a box after ejection and can thus be easily removed from the production line. Where the sausages are conveyed on or by a conveyor belt, they need to be removed from the conveyor belt in order to achieve such ejection.

In the case of conveyor belts with sausages lying on top, the orientation of the sausages is often undefined. However, solutions for ejecting the sausages have already been designed, for example guide members that are moved mechanically into the conveying space, thus diverting any sausages to be removed. This sometimes requires complex mechanical designs. In the case where conveying involves the sausages being engaged by conveyor belts, they are conveyed in a defined position and with a defined distance between them. The latter can be adjusted as required via the belt transmission ratio. A conveyor belt underneath the sausages is rendered obsolete when the sausages are gripped by horizontal engagement. This creates a space underneath the conveyor belts into which the sausages can fall. A similar principle applies when there is vertical engagement by conveyor belts, where the lateral areas to the side of the conveyor belts can be left free and the sausages can be released by respective system components from their engagement by the conveyor belts.

As a result, it would be desirable to provide an improved ejector device for ejecting sausages or other food portions. Likewise, it would also be desirable to provide an improved conveyor device for sausages, an improved system for processing a pasty food mass and an improved method of ejecting sausages.

SUMMARY

These and other technical objects and problems are addressed by the embodiments provided in this invention. To this end, the ejector device according to embodiments of the present invention includes at least one adjustment mechanism for ejecting a food portion in an ejection area and which is so designed that the distance of the conveyor belts from each other in the conveying area can be varied at least partially in such a way that (at least) one food portion is engaged by the conveyor belts in the conveying mode and said distance is increased in an ejection mode in such a way that a food portion is taken out of engagement with the conveyor belts in such a way that it can be ejected.

According to various embodiments of the invention, the unit is so designed that the distance between the conveyor belts can be varied at least partially, i.e., locally or in sections or also in their entirety, in order to produce or interrupt engagement between the food portion and the conveyor belts. When there is engagement, the food portion is conveyed, and if engagement is interrupted, the food portions are no longer held and can be ejected. The force of gravity can be utilized here, with the result that the food portion falls downward under that force. Alternatively, other aids for supporting the ejection process are also possible. Due to the absence of engagement when the distance between the conveyor belts is increased, the sausages, for example, drop downward and can be collected in a collecting box, for example. Ejection is preferably performed in an automatic process without any delay in the circulation speed of the belts, or in the conveying speed of the sausages. According to embodiments of the invention, the ejector device, in particular its conveyor belts, may be so designed that ejection is performed in the upstream region where the sausages are fed in, in a downstream region where the sausages are to be discharged again, or in a middle region. The sausages are preferably conveyed and processed in a continuous process.

According to a development of the invention, the ejector device has at least one adjustment mechanism that is or has a pneumatic unit, thus allowing the ejector device to be actuated in accordance with the invention by simple technical means and with compressed air that is generally available in production enterprises. According to another development of the invention, each pneumatic unit has a pneumatic cylinder as a drive element or as an actuating member.

According to a development of the invention, a pneumatic unit, particularly preferably each pneumatic unit having a pneumatic cylinder, is assigned to at least one conveyor belt and is configured to increase or reduce the distance of the conveyor belt, at least in sections thereof, from the opposite conveyor belt in the conveying area. After an ejection signal has been generated, the pneumatic cylinder retracts, with the result that the belt path and the distance between the conveyor belts is changed locally, such that the sausages are taken out of engagement with the conveyor belts.

According to a development of the invention, the ejector device is connected to a controller which is connected to a sensor unit for detecting a feature of the food portion, in particular a shape feature, wherein the controller provides a signal to control the adjustment mechanism(s) of the ejector device. The sensor unit thus allows automatic or autonomous ejection of sausages which are no longer suitable for further processing. The sensor unit is coupled to the controller by electrical leads or a radio link, so that signals can be transmitted reliably to the controller. The controller is used to control the ejector device and is configured in such a way that the adjustment mechanism(s), in particular its or their drive element(s), can be controlled in order to trigger an actuation to eject. The controller may alternatively be a separate controller for the ejector only, or the control system of a stuffing machine, or the controller of another food treatment device, for example a twist linking device, a crimper, a separating device for producing separate sausages, or an alignment device for aligning sausages. According to embodiments of the invention, different sensor units may be used to recognize specific features or defects of sausages, and are already known from the prior art. A plurality of sensor units or sensors may also be used in order to recognize features of the sausages, in particular defects of the sausages, and to provide signals to the controller. A sensor unit may be embodied as a light sensor, an infrared light sensor or as an imaging sensor, for example.

According to a development of the invention, the ejector device additionally includes a supporting device in the ejection area, preferably an air jet nozzle or a mechanical actuating element, which is arranged and configured in such a way that an additional force supporting ejection can be applied to the food portion. The supporting device is used to support ejection without reducing the conveying speed of the sausages. In particular, an air jet nozzle may be arranged above the path of the food portions and a force directed vertically downward may be applied to the food portion by an air current, which preferably acts in conjunction with the gravitational force. A possible alternative, however, is to apply a force to the food portion by a supporting device in order to support ejection, a force which is directed in a different direction, for example horizontally.

In a further embodiment, a conveyor device is provided that includes an ejector device as described above and at least one further belt pair coupled by a transmission gear, preferably a belt drive, to the belt pair of the ejector device in such a way that different conveying speeds in the conveying direction can be set for the two pairs of belts.

The different conveying speeds in the conveying direction allow the distance between the sausages to be adjusted during conveying.

According to a further embodiment, a system is provided for processing a pasty food mass, characterized in that the system has a conveyor device and a stuffing machine and at least one food treatment device, preferably a twist linking device, a separating device and/or one or more alignment device(s) for aligning individual sausages. According to embodiments of the invention, a food treatment device is a device or machine, known per se, for further processing and treating food, in particular food portions such as sausages. This can be a twist linking device, a crimper, a separating device for producing separate sausages from a previously linked chain of sausages, or also an alignment device for aligning sausages.

According to another embodiment, a method of ejecting food portions is provided, in which the food portions are engaged by parallel conveyor belts, such that the food portions can be conveyed in a preferably defined position in a particular conveying direction, characterized in that the distance between the parallel conveyor belts can be changed in sections or at least partially in such a way the sausages are no longer engaged by the conveyor belts and can be ejected from the conveying area.

According to a development of the method, the sausages pass through at least two pairs of belts, with a difference in the conveying speed between the pairs of belts, such that the gap between the food portions can be adjusted on the basis of the transmission ratio between the pairs of belts.

According to another development of the method, the ejection of sausages in the ejector device is supported by the supporting device, preferably by air pressure.

The method according to embodiments of the invention is preferably carried out by an ejector device and its preferred features, as previously described, the advantages and manner of operation of which are applied accordingly for the method; reference is made in that regard to the disclosure of the ejector device, and in order to avoid repetitions to the descriptions in that regard.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
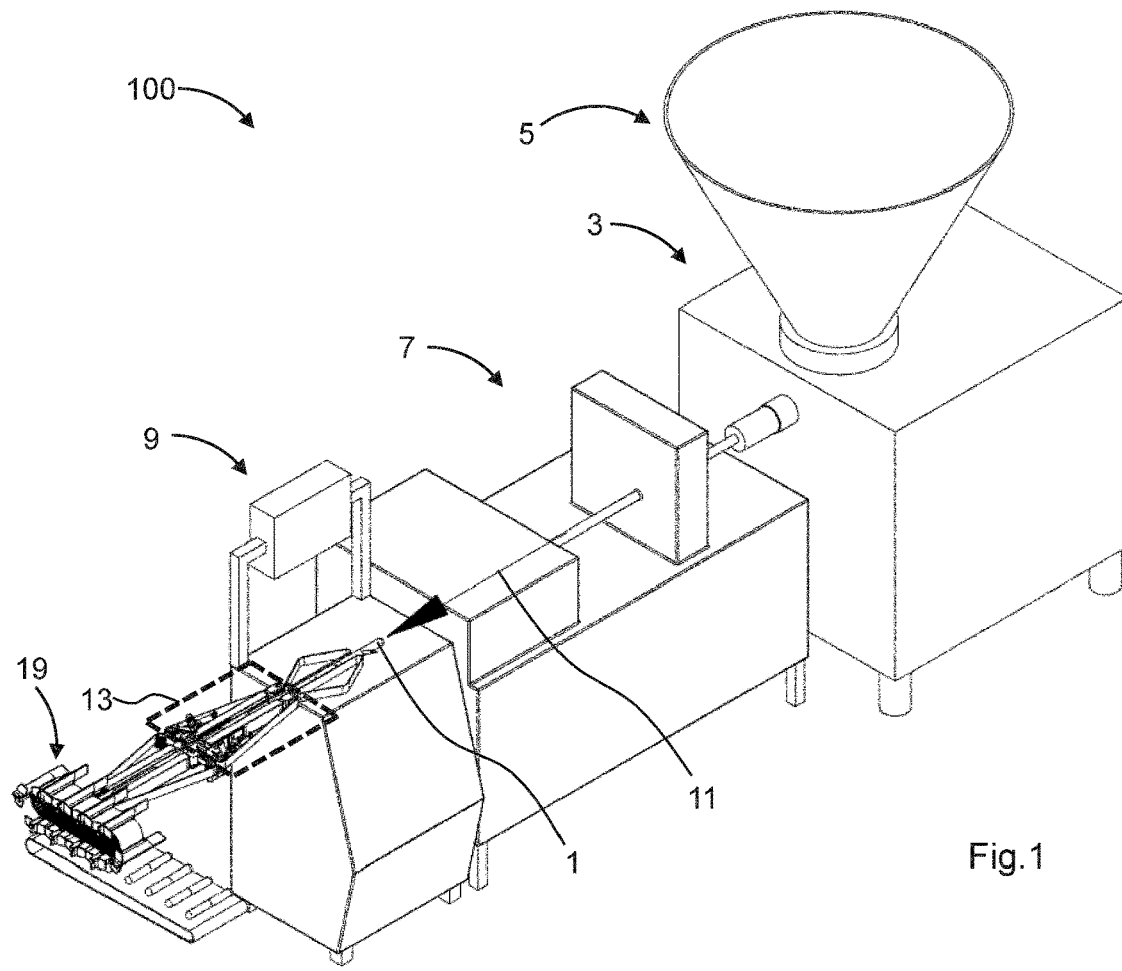
FIG. 1 shows a perspective view of a system comprising a plurality of machines as well as an ejector device and conveyor device according to embodiments of the invention.

The system 100 shown in FIG. 1 is used to produce food portions, in particular elongate sausages 1. System 100 includes a stuffing machine 3, with a feeding hopper 5 for receiving a pasty food mass such as sausage meat, for stuffing the sausage meat into a casing, in particular into a natural gut casing. System 100 also includes at least one further food treatment device, preferably, in particular, a twist linking device 7 for twisting and thus producing twist points between single sausages 1 and thus food portions, and a separating device 9 for producing separate sausages 1. Stuffing machine 3, twist linking device 7 and separating device 9 can be selected and combined according to their particular application.

Downstream from separating device 9 in conveying direction 11, system 100 has an ejector device 13 according to embodiments of the invention for ejecting sausages 1, by which the method according to further embodiments of the invention can be carried out. System 100 can also be combined with one or more downstream alignment device(s) 19.

Figure 2:
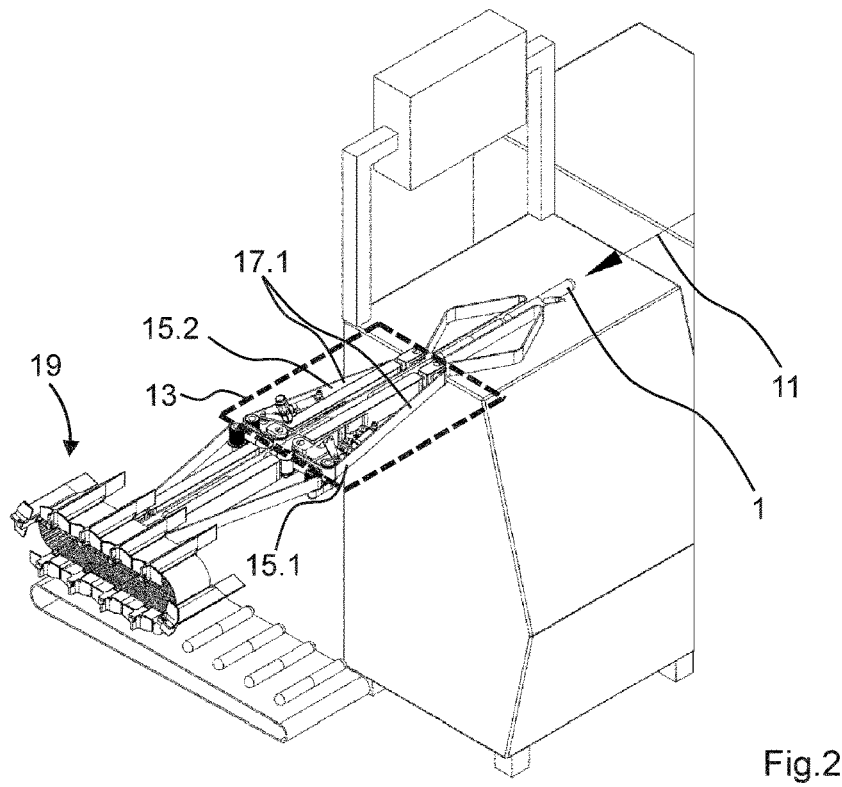
FIG. 2 shows an enlarged detail of the system with ejector device shown in FIG. 1.

Ejector device 13 for ejecting sausages 1 is shown additionally in an enlarged detail in FIG. 2 and includes conveyor belts 15.1 and 15.2 forming a belt pair 17.1.

Figure 3:
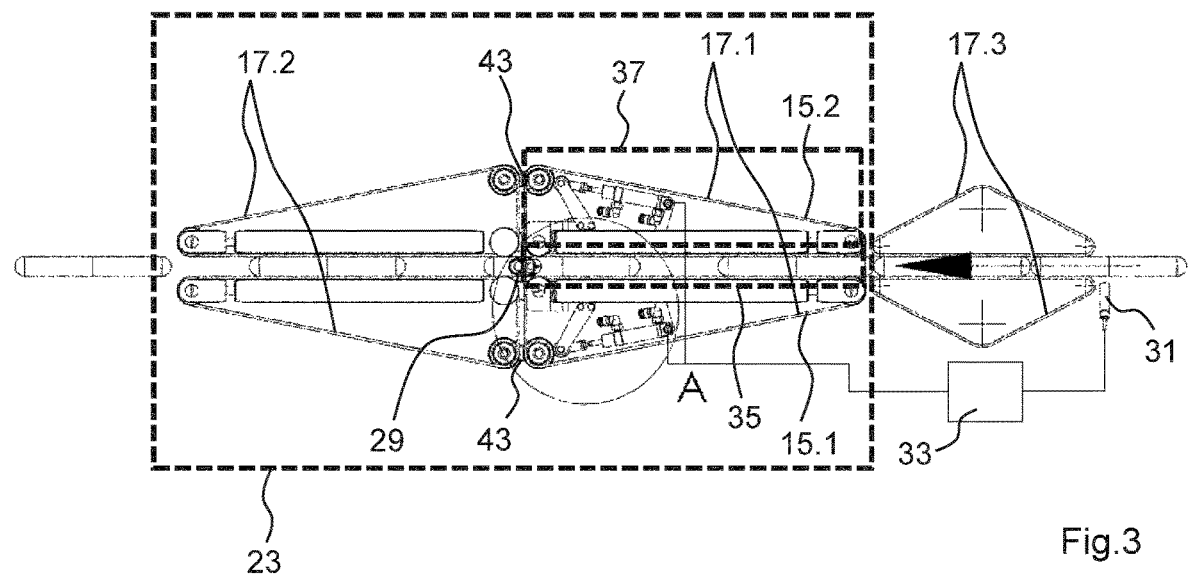
FIG. 3 shows a top view of the conveyor device having the ejector device as shown in FIG. 1.

The components of conveyor device 23, including ejector device 13, can be seen in the embodiment shown in FIG. 3. The sausages are conveyed between conveyor belts 15.1 and 15.2 or belt pair 17.1 and between belt pairs 17.2 and 17.3, with a conveying area 35 being passed through in ejector device 13. When a section of conveyor belt 15.1 or 15.2 has passed through conveying area 35 in operation, the former is returned in a return area 37 to the starting position of the conveying area. Belt pair 17.1 of ejector device 13 and the belt pair 17.2 downstream in conveying direction 11 are preferably connected to each other via a transmission gear 43 for stepwise adjustment of the conveying speed.

Figure 4:
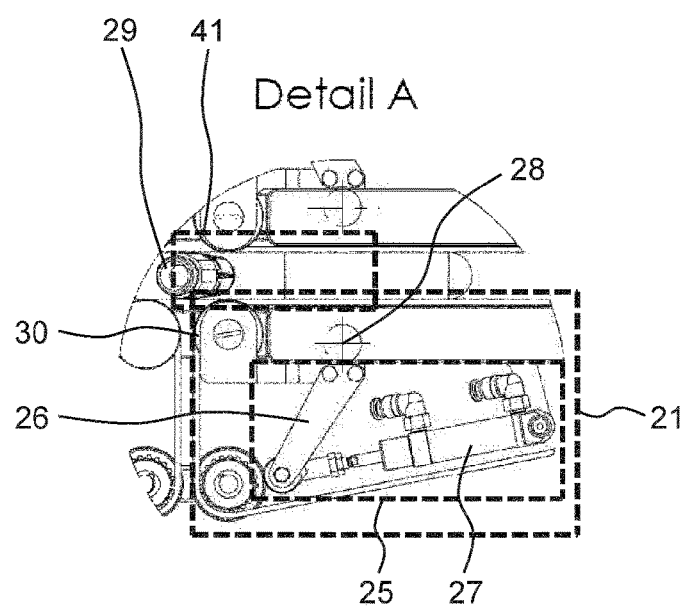
FIG. 4 shows an enlarged detail of the ejector device shown in FIG. 3.

Conveyor device 23 also includes a sensor unit 31 which is connected to a controller 33, which in turn is connected to adjustment mechanisms 21, shown in detail in FIG. 4, in order to control the latter. Controller 33 is connected by electrical leads or even wirelessly to sensor unit 31, which is configured to detect a feature of the food portion, and which is also configured to provide a signal to the controller in order to control the adjustment mechanism(s) of the ejector device. Alternatively, in a manner not shown in further detail, controller 33 may be a separate controller for ejector device 13 only, or the controller, for example, of stuffing machine 3, or the controller of a further food treatment device, for example of twist linking device 7 or separating device 9. Different sensor units may be used to recognize specific features or defects of sausages. A plurality of sensor units or a plurality of sensors may also be used. The (at least one) sensor unit 31 may be embodied as a light sensor, an infrared light sensor or as an imaging sensor, for example.

As the embodiment in FIG. 4 shows, adjustment mechanisms 21 preferably have pneumatic units 25, by which the distance between the conveyor belts in ejector device 13 can be partially changed. Pneumatic units 25 have pneumatic cylinders 27 that are each connected in an articulated manner at their tip to one end of a lever 26. Lever 26 can be rotated about rotational axis 28. A deflection roll 30, via which a conveyor belt 15 is deflected, is attached to the other end of lever 26. When adjustment mechanisms 21 receive the ejection signal from controller 33, pneumatic cylinders 27 retract with the result that lever 26 rotates about rotational axis 28 and deflection roll 30 moves in adjustment direction 39.1 or 39.2. As a consequence, the distance between the conveyor belts 15.1 and 15.2 of the respective belt pair 17.1 is increased locally. Ejector device 13 is thus in ejection mode. By supporting device 29, embodied here in the form of an air jet nozzle, the operation to eject sausages 1 in ejection area 41 is given additional support.

Figure 5:
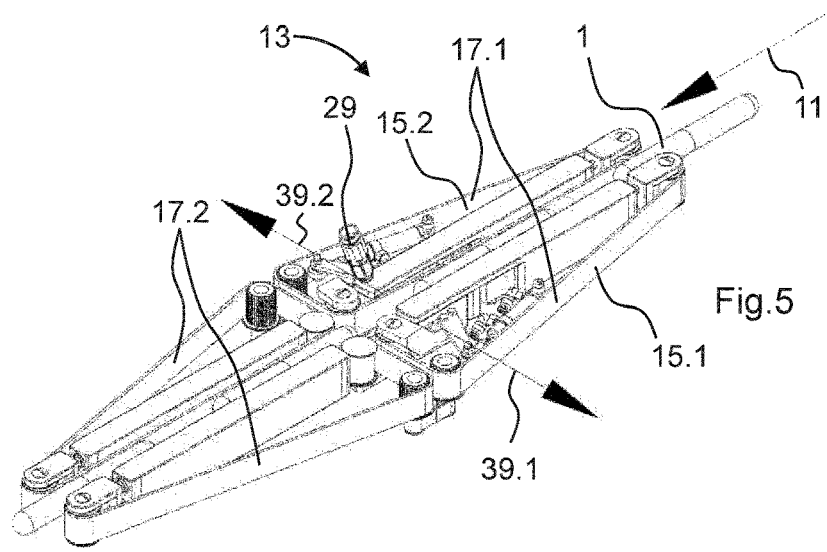
FIG. 5 shows a perspective view of parts of the system and the ejector device of FIG. 1, with a sectionally increased distance between two conveyor belts.
Figure 6:
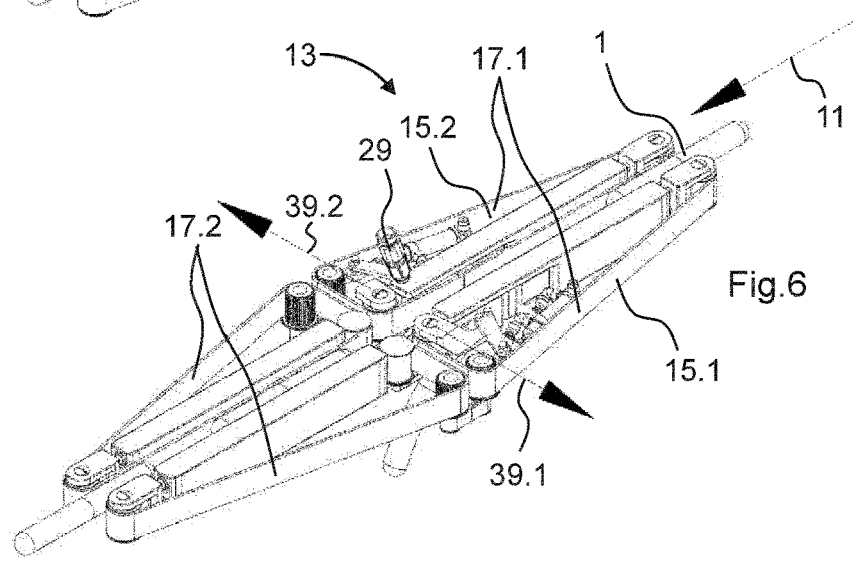
FIG. 6 shows a perspective view of parts of the system and the ejector device similar to FIG. 5, with a sectionally increased distance between two conveyor belts, wherein one of the sausages has been taken out of engagement with the conveyor belts and is dropping down.
Figure 7:
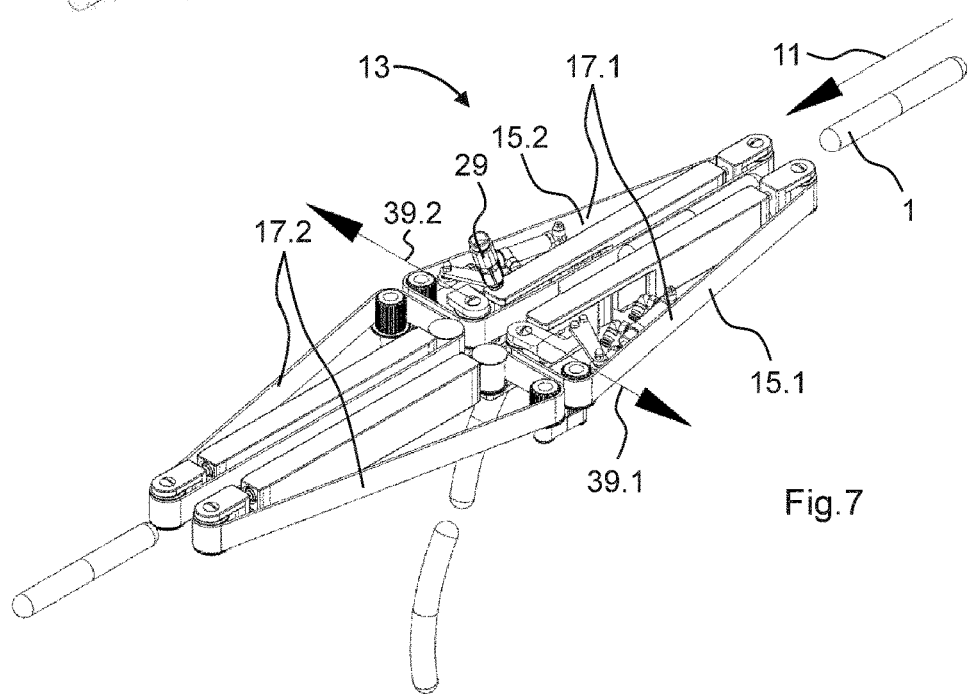
FIG. 7 shows a perspective view of parts of the system and the ejector device similar to FIG. 6, with a sectionally increased distance between two conveyor belts, wherein a second sausage has been taken out of engagement with the conveyor belts and is dropping down.

The ejection to be achieved by ejector device 13 is illustrated once again in FIGS. 5 to 7. FIG. 5 shows an embodiment in which, after an ejection signal has been generated, the distance between conveyor belts 15.1 and 15.2 of belt pair 17.1 has been locally increased by movement in adjustment directions 39.1 and 39.2. By increasing the distance, all sausages 1 to be removed are taken out of engagement with conveyor belts 15.1 and 15.2 and drop downward, as shown in FIG. 6 and FIG. 7. By supporting device 29, additional downward pressure is exerted on those sausages 1 to be ejected, thus supporting the ejection process.

Figure 8:
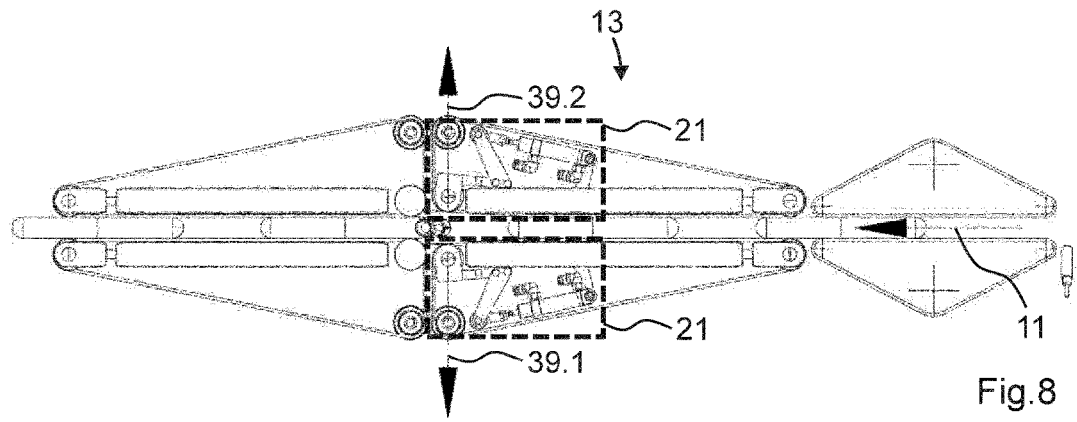
FIG. 8 shows a top view of parts of the system and the ejector device of FIG. 1, with a sectionally increased distance between two conveyor belts close to the transition from the ejector device to a downstream belt pair.
Figure 9:
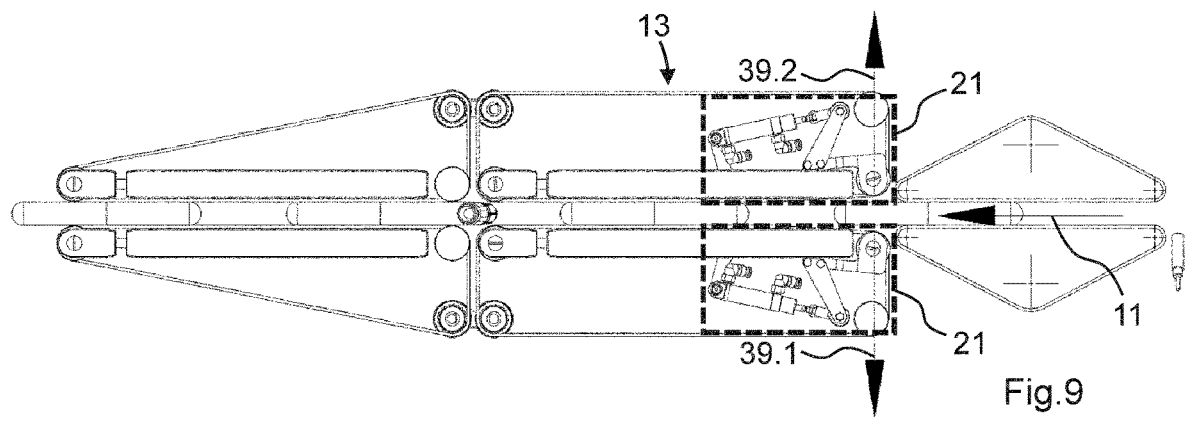
FIG. 9 shows a top view of parts of the system and the ejector device similar to FIG. 8, with a sectionally increased distance between two conveyor belts close to the transition from a processing station of the system, upstream in a conveying direction, to the ejector device.
Figure 10:
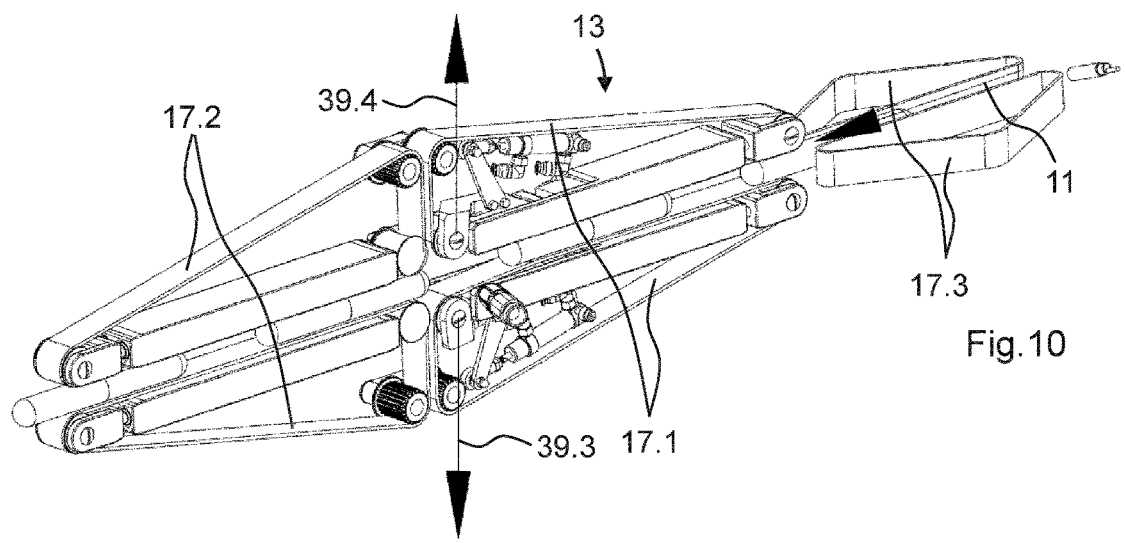
FIG. 10 shows parts of the system and the ejector device of FIG. 1 in another perspective view, with the conveyor belts engaging the sausages vertically.

FIGS. 8 to 10 show various other embodiments of ejector device 13. The embodiment according to FIG. 8 corresponds to the embodiment of ejector device 13 shown in the previous Figures, in which adjustment mechanisms 21 are arranged close to the transition to the belt pair 17.2 downstream in conveying direction 11 so that the distance between conveyor belts 15.1 and 15.2 can be partially changed in this area. In the embodiment according to FIG. 9, in contrast, adjustment mechanisms 21 are arranged close to the transition from a processing station of system 100, upstream in conveying direction 11 to ejector device 13, so that the distance between the conveyor belts can be varied in this area. Thus, sausages 1 can already be ejected in this latter area. According to various embodiments, ejector device 13 and the associated method of ejecting defective sausages may be so designed that ejection is performed in the upstream region where the sausages are fed in, in a downstream region where the sausages are to be discharged again, or in a middle region.

The embodiments shown in FIGS. 1 to 9 show ejector devices 13 in which sausages 1 are engaged horizontally. An embodiment involving vertical engagement and adjustment directions 39.3 and 39.4 is shown in FIG. 10. The structure of conveyor device 23 is the same as the embodiment shown in FIG. 8 and FIG. 9, with the exception that ejector device 13 and belt pair 17.2 downstream in conveying direction 11 are rotated by 90°.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the scope defined by the claims of the present invention.

What is claimed is:

1. An ejector device for food portions, comprising:
   two circulating and spaced-apart conveyor belts which can be driven by at least one drive element and which form a belt pair and have:

a conveying area which in operation is moved in a conveying direction, and a return area, wherein a food portion in the conveying area between the two conveyor belts is engaged by the two conveyor belts in a conveying mode and can be conveyed in the conveying direction, and wherein the ejector device has at least one adjustment mechanism for ejecting a food portion in an ejection area and which is so designed that a distance of the conveyor belts from each other in the conveying area can be varied at least partially in such a way that (at least) one food portion is engaged by the conveyor belts in the conveying mode and said distance is increased in an ejection mode in such a way that a food portion is taken out of engagement with the conveyor belts in such a way that the food portion can be ejected.

2. The ejector device of claim 1, wherein the at least one adjustment mechanism is or includes a pneumatic unit.

3. The ejector device of claim 2, wherein each pneumatic unit includes a pneumatic cylinder.

4. The ejector device of claim 3, wherein each pneumatic unit having a pneumatic cylinder is assigned to at least one conveyor belt, with each being configured to increase or reduce the distance of said conveyor belt, at least in sections thereof, from the opposite conveyor belt in the conveying area.

5. The ejector device of claim 4, wherein the ejector device is connected to a controller which is connected to a sensor unit for detecting a shape feature of the food portion, wherein the controller provides a signal to control the at least one adjustment mechanism of the ejector device, and wherein the ejector device additionally includes a supporting device in the ejection area, which is arranged and configured in such a way that an additional force supporting ejection can be applied to the food portion, the supporting device including at least one of an air jet nozzle and a mechanical actuating element.

6. The ejector device of claim 2, wherein a pneumatic unit is assigned to at least one conveyor belt and is configured to increase or reduce the distance of said conveyor belt, at least in sections thereof, from the opposite conveyor belt in the conveying area.

7. The ejector device of claim 1, wherein the ejector device is connected to a controller which is connected to a sensor unit for detecting a feature of the food portion, wherein the controller provides a signal to control the at least one adjustment mechanism of the ejector device.

8. The ejector device of claim 1, wherein the ejector device additionally includes a supporting device in the ejection area, which is arranged and configured in such a way that an additional force supporting ejection can be applied to the food portion.

9. A conveyor device for conveying food portions, wherein the conveyor device includes the ejector device of claim 1 and at least one further belt pair coupled by a transmission gear to the belt pair of the ejector device in such a way that different conveying speeds in the conveying direction can be set for the two pairs of belts.

10. A system for processing a pasty food mass, comprising the conveyor device of claim 9, a stuffing machine, and at least one food treatment device, the at least one food treatment device including a twist linking device, a separating device, and/or one or more alignment device(s).

11. A method of ejecting food portions, comprising:

engaging the food portions by parallel conveyor belts, such that the food portions can be conveyed in a preferably defined position in a particular conveying direction, and changing a distance between the parallel conveyor belts in sections or at least partially in such a way the food portions are no longer engaged by the conveyor belts and can be ejected from the conveying area.

12. The method of claim 11, wherein the food portions pass through at least two pairs of belts, with a difference in a conveying speed between the pairs of belts, such that a gap between the food portions can be adjusted on the basis of a transmission ratio between the pairs of belts.

13. The method of claim 11, wherein the ejection of food portions in the ejector device is supported by a supporting device.

14. The method of claim 12, wherein the ejection of food portions in the ejector device is supported by a supporting device and specifically by air pressure.

\* \* \* \* \*